United States Patent Office 3,438,815
Patented Apr. 15, 1969

3,438,815
ELECTROCHEMICAL CELL CONTAINING AN ELECTRODE COMPRISING A CATALYTIC LAYER CONSISTING OF UNIFORMLY DISPERSED CATALYTIC METAL PARTICLES AND A HYDROPHOBIC POLYMER, AND (IN CONTACT WITH THE CELL ELECTROLYTE) A SEPARATE POROUS METAL LAYER
Jose D. Giner, Glastonbury, Conn., assignor, by mesne assignments, to Leesona Corporation, Cranston, R.I., a corporation of Massachusetts
No Drawing. Continuation of application Ser. No. 491,881, Sept. 30, 1965. This application May 1, 1967, Ser. No. 635,267
Int. Cl. H01m 27/04
U.S. Cl. 136—86          18 Claims

ABSTRACT OF THE DISCLOSURE

An electrochemical device comprising an anode, a cathode, and an electrolyte separating said anode and cathode is described. According to the invention, at least one of said anode or cathode comprises an integral porous metal layer adjacent to and in physical contact with a separate catalytic layer. The catalytic layer comprises a uniform mixture of a catalytic metal and a hydrophobic polymer. When the electrode is disposed of in an electrochemical cell, the integral porous metal layer is in contact with the electrolyte of the cell.

---

This is a continuation of application Ser. No. 491,881 filed Sept. 30, 1965, and now abandoned.

This invention relates to improved electrodes primarily for use in an electrochemical device such as a fuel cell, and to the electrochemical device employing the novel electrodes. More particularly, the invention embraces a biporous electrode comprising a porous metal layer in contact with an electrochemically active catalytic layer. The catalytic layer comprises a hydrophobic polymer material; therefore, in the final construction of the electrode, the catalytic layer is relatively hydrophobic in comparison to the metal layer. In operation in an electrochemical device, the bare metal layer will be in contact with the electrolyte. For convenience, hereinafter the electrodes will be described with reference to a fuel cell. As will be apparent, however, similar considerations governing their use in fuel cells may apply to other electrochemical devices enhancing their use therein.

A fuel cell, as the term is employed herein, designates and electrochemical cell for the direct production of electrical current from a fuel and oxidant. With these cells, it is not necessary to go through the usual conversion of chemical energy to heat energy, to mechanical energy to electrical energy as is common with heat engines. These cells in their most simplified design comprise a housing, an oxidizing electrode, a fuel electrode, and an electrolyte. In operation, it is necessary that the fuel and oxidant contact a surface of their respective electrodes where a process of adsorption and de-adsorption occurs, leaving the electrodes electrically charged, with the second surface of the electrodes being in contact with the electrolyte. Depending upon the nature of the electrolyte, ions are transferred through the electrolyte from the anode to the cathode or from the cathode to the anode. Electrical current is withdrawn from the cell and passed through a suitable load where work is accomplished. Although the electrolyte can be a solid, a molten paste, or liquid, as a result of recent developments, for practical considerations, emphasis has been on the use of liquid electrolytes, more specifically upon aqueous electrolytes.

In operation, a critical problem encountered in fuel cells is the control of the three-phase reaction interface of the reactant, electrode, and electrolyte. In an effort to control the interface, Francis T. Bacon suggested the use of bi-porous electrodes. When such electrodes are used in a fuel cell, the surface having the large pores is in contact with the reactant gas and the surface having the fine pores is in contact with the electrolyte. The reaction interface of the cell occurs substantially at the boundary of the coarse and fine pore layers.

In spite of the improvement provided by the bi-porous electrode, it was found that these electrodes, in order to avoid flooding and consequent blocking of the pores as well as to provide sufficient structural integrity, were necessarily relatively thick, making the resulting fuel cell bulky. Furthermore, since the interface (liquid-gas) is held by the applied gas pressure, an accurate pressure regulation and pore size distribution is needed to avoid bubbling at high pressures and flooding at low pressures. In an effort to avoid the aforesaid disadvantages, the use of screen-type electrodes was suggested. These electrodes comprise a metal screen having a catalytic material with a hydrophobic component pressed into and around the screen. These electrodes have a low thickness, resulting in a more compact packing. Moreover, since the interface is controlled by the hydrophobic material, no accurate pore distribution and pressure regulation is needed. Unfortunately, however, screen electrodes also have a low bubble pressure and low structural integrity.

It is a primary object of the present invention, therefore, to provide an electrode which possesses the advantages of the bi-porous metal electrodes, i.e., high bubble pressure, as well as the advantages of the screen electrodes, i.e., low thickness and consequent compact packing and greater tolerance in the pore size distribution, so that no flooding occurs at low pressures and bubbling at high pressures.

These and other advantages of the invention will be more readily apparent from the following detailed description, with particular emphasis being placed on the working examples.

The aforesaid objects of the present invention are accomplished by the construction of an electrode comprising a porous self-sustaining metal layer, such as nickel, of selected pore size in contact with a catalytic layer which has been rendered relatively hydrophobic in comparison to the metal layer by means of incorporating a hydrophobic polymer therein. More specifically, a nickel fine pore plate is coated on one major surface with a dispersion of a noble metal black and polytetrafluoroethylene. In operation in a fuel cell, the bare metal layer of the electrode will be in contact with the electrolyte of the cell and the catalyst layer will be in contact with the reactant. Therefore, when employing the electrodes according to the invention in a fuel cell as described hereinbefore, the fine pore metal layer which is hydrophilic controls the bubble pressure and the catalytic layer which is hydrophobic controls the electrolyte interface within the electrode, preventing flooding of the electrodes and consequent damage and/or loss of power.

In the construction of the electrodes, the metal layer can be any of various metals including nickel, copper, iron, tantalum, zirconium, and the noble metals such as gold, silver, platinum, palladium, osmium, ruthenium, and the like. The primary requirement is that the metal selected possess the essential properties permitting it to be fabricated as a porous structure. Additionally, the material must be resistant to the electrolyte of the cell. For the aforesaid reasons, from the standpoint of their desirable physical properties and relative low cost in comparison to the noble metals, nickel and tantalum are preferred.

The construction of the metal layer can be carried out by methods known in the art for providing porous plates. Thus, a metal powder of select particle size can be sifted onto a ceramic carrier plate at the required thickness and thereafter the metal carefully sintered to obtain a porous structure. Alternatively, the metal layer can be constructed by admixing the metal powder with a filling and/or binding agent to obtain an integral structure and, thereafter, burning out the filled and/or binder during the sintering of the structure. The actual construction of such porous plates is known in the art and does not comprise a part of the present invention. The catalytic layer comprises a metal black, such as the noble metal blacks, in intimate contact with a hydrophobic polymer. The metal black and polymer admixture can be formed employing numerous methods with it only being essential that the polymer material be uniformly distributed throughout the catalytic layer. Thus, the admixture for applying to the metal layer can be formed by preparing a dispersion of the metal black with the hydrophobic polymer particles by suspending the material in a suitable medium such as water, including a wetting agent. After the black and particles are mixed in the water to obtain a uniform dispersion, the water is removed sufficiently to give a doughlike mass which can be spread or rolled onto and into the porous metal layer. Alternatively, the metal black-polymer layer can be applied to the metal plate by spraying. It is only essential that precautions be taken to avoid having the catalytic layer completely block the pores of the metal layer. In order to accomplish the aforesaid result, it may be desirable to initially fill the pores of the porous layer with an inert solid phase which can be easily removed after the catalytic layer is applied. For example, the porous layer can be filled with a material such as polyvinylalcohol which is soluble in water and which can be removel by bringing the fine pore layer in contact with water after the catalytic layer is applied. Alternatively, a frozen inert liquid can be incorporated into the porous layer which can be removed upon drying or sintering of the catalyst polymer mixture. Methods of constructing the electrodes will be apparent from the examples set forth hereinafter.

Although the catalytic layer can be composed of virtually any material which will favorably influence an electrochemical reaction, such as copper, gold, nickel, silver, cobalt, and their alloys, because of their exceptional properties for enhancing an electrochemical reaction, the Group VIII metals of the Mendelyeev's Periodic Table are preferred, i.e., platinum, ruthenium, palladium, osmium, iridium, rhodium, and their alloys or coatings of these noble metals on non-noble metal substrates. The polymer which is dispersed with the catalytic metal must be relatively hydrophobic. Because of its exceptional hydrophobicity as well as its resistance to heat and the like, polytetrafluoroethylene is preferred. Other materials which may be employed include polystyrene, polyethylene, polytrifluorochloroethylene, polyvinyl fluoride, polyvinylidene fluoride, and copolymers thereof.

As a modification of the invention, the catalytic layer composed of the metal black and hydrophobic polymer is treated with a hydrophobic polymer to obtain a thin, substantially continuous film of the polymer over the catalytic layer. The electrodes prepared as described have been found to support increased current density at a given voltage. The enhanced results are apparently a result of the increased hydrophobicity (wetting properties) of the structure.

The electrodes of the present invention can be employed in fuel cells, using virtually any of the prior art electrolytes. As is well known, for an efficient fuel cell it is necessary that the electrolyte remain invariant and have high ionic conductivity. The alkaline electrolytes such as sodium hydroxide, potassium hydroxide, and the alkanolamines are particularly desirable. However, acid electrolytes such as sulfuric acid, phosphoric acid, etc., may be employed. Additionally, the present electrodes can be employed as either the anode or cathode of the fuel cell. By judiciously selecting the activating metal of the catalytic layer, the electrodes of the present invention can be tailored to be particularly suitable for any specific fuel including hydrogen, carbon monoxide, methane, methanol, propane, and kerosene vapors. Additionally, metals such as silver and gold provide excellent properties in the electrodes for use as the cathode operated on air as the oxidant.

Furthermore, the present electrodes can be utilized in fuel cell systems operating in a wide temperature range. However, one of the outstanding features of the present electrodes is their ability to provide practical current densities at a given voltage at low temperatures. Preferably, therefore, the present electrode will be employed in fuel cells operated at temperatures of from about 25 to 150° C. However, the cells can be operated at temperatures as high as about 250° C., it being understood that generally the higher the temperature, the greater the rate of the electrochemical reaction. It is further understood, however, that at higher temperatures ancillary problems such as insulation of the cell and the like are increased.

The thickness of the metal layer of the electrodes is only important for its mechanical stability, while the thickness of the catalytic layer to a large extent depends upon the amount of catalyst necessary to obtain the desired performance. The minimum thickness of the metal layer is immaterial so long as the electrode is structurally stable, i.e., able to withstand the necessary pressure of the fuel cell without breaking the layer, while the bubble pressure is determined by the size of the pores. It is, of course, a foremost object of the invention to provide a thin electrode with a high bubble pressure. Therefore, a preferred range of thickness is from approximately 5 to 20 mils for the metal layer, with the catalyst layer being from 1 to 20 mils. The pore size of the metal layer is preferably from 1 to 50 microns in diameter to establish the desired bubble pressure. However, the porosity should be as great as possible while maintaining the integrity of the plate. The electrodes can be fabricated as flat, unsupported sheets, or they may be formed as a corrugated or tubular structure. The tubular construction is sometimes preferred since the effective surface area of the electrode is increased and is ideal for bi-polar or multipolar cells. Additionally, a tubular structure will normally withstand greater pressures.

Having described the invention in general terms, the following examples are set forth to more particularly illustrate the invention. However, they are not meant to be limiting. Parts are by weight unless otherwise specified.

EXAMPLE 1

A fine pore nickel sheet having a porosity of 55 percent and an average pore diameter of 10 microns, after being cleaned with acetone, is coated on one surface with an aqueous mixture of platinum black and polytetrafluoroethylene (PTFE). The mixture was composed of 30 weight percent PTFE and 70 weight percent platinum. The electrode was vacuum dried, and thereafter sintered at 275° C. for five minutes.

Two electrodes so formed were tested in a fuel cell fed with hydrogen and oxygen at 60° C. The electrolyte was a 28 percent aqueous solution of potassium hydroxide. The cell provided current densities as follows:

| Cell voltage, mv. | Current density, ma./cm.$^2$ |
| --- | --- |
| 500 | 800 |
| 600 | 550 |
| 700 | 350 |
| 800 | 190 |

EXAMPLE 2

An electrode was prepared substantially as described in Example 1; however, the catalytic layer was put down in two separate applications. The first layer contained ten weight percent PTFE and 6.1 mg./cm.$^2$ of platinum black. After the first layer was dried and sintered, a second layer was applied which contained 30 weight percent PTFE and 6.6 mg./cm.$^2$ of platinum black. This electrode, in a fuel cell identical to that described in Example 1, provided the following current densities:

| Cell voltage, mv.: | Current density, ma./cm.$^2$ |
|---|---|
| 550 | 770 |
| 600 | 670 |
| 700 | 475 |
| 800 | 275 |
| 900 | 85 |

EXAMPLE 3

An electrode was constructed exactly as described in Example 1; however, after application of the catalytic layer, a thin layer of polytetrafluoroethylene was applied thereto by spraying the catalytic layer with an aqueous PTFE dispersion diluted to 10 percent solids to obtain 1 mg./cm.$^2$ of PTFE on the electrode. The performance of the electrode was substantially improved in comparison to the results obtained in Example 1.

EXAMPLE 4

An electrode identical to that described in Example 2 was constructed. However, after the second layer of platinum black-PTFE was applied, a thin layer of PTFE was applied as described in Example 3. Performance of the electrode was substantially improved over the results obtained in Example 2.

In Examples 1-4, the metal of the metal layer can be replaced with other metals including copper, silver, tantalum, gold, and iron. Additionally, the metal of the catalytic layer can be replaced by other electrochemically active materials including nickel, copper, gold, silver, palladium, platinum, ruthenium, and rhodium. The hydrophobic polymer can be replaced with other polymers including polystyrene, polyethylene, polytrifluoroethylene, polyvinyl fluoride, polyvinylidene fluoride, polytrifluorochloroethylene, and co-polymers thereof.

As will be apparent to one skilled in the art, the illustrative examples are only set forth as preferred embodiments of the invention. However, the invention is not to be construed as limited thereby. It is possible to produce still other embodiments without departing from the inventive concept herein described and such embodiments are within the ability of one skilled in the art. Furthermore, as will be apparent to those skilled in the art, while the invention has been described with reference to fuel cells, it is possible to employ the aforesaid electrodes in other electrochemical devices.

In the claims:

1. An electrochemical cell for the generation of electrical energy comprising an electrolyte chamber containing an electrolyte, at least one oxidant electrode, at least one fuel electrode, said electrodes partially defining said electrolyte chamber and being in contact with said electrolyte, at least one of said electrodes comprising an integral porous self-sustaining metal layer of uniform and controlled porosity adjacent to and in physical contact with a separate catalytic layer, said catalytic layer consisting essentially of catalytic metal particles and a hydrophobic polymer, said catalytic metal particles and hydrophobic polymer being uniformly dispersed in said catalytic layer, said integral porous self-sustaining metal layer facing the electrolyte chamber and said integral porous self-sustaining metal layer being in contact with the electrolyte of the cell.

2. The electrochemical cell of claim 1 wherein the said metal layer is composed of nickel.

3. The electrochemical cell of claim 1 wherein the catalytic metal is platinum black.

4. The electrochemical cell of claim 1 wherein said hydrophobic polymer is polytetrafluoroethylene.

5. The electrochemical cell of claim 1 wherein a thin coating of a hydrophobic polymer is applied to said catalytic layer.

6. The electrochemical cell of claim 5 wherein the thin coating of hydrophobic polymer is polytetrafluoroethylene.

7. The electrochemical cell of claim 1 wherein said metal layer is composed of copper.

8. The electrochemical cell of claim 1 wherein the catalytic metal is finely divided nickel.

9. The electrochemical cell of claim 1 wherein the catalytic metal is a finely divided nickel-cobalt alloy.

10. The electrochemical cell of claim 1 wherein the catalytic metal is coated on a less noble substrate of conductive powder.

11. The electrochemical cell of claim 1 wherein the said porous self-sustaining metal layer has a thickness of from about 5 to 20 mils and a pore size of from about 1 to 50 microns.

12. An electrochemical cell for the generation of electrical energy comprising an electrolyte chamber containing an electrolyte, at least one oxidant electrode, at least one fuel electrode, said electrodes partially defining said electrolyte chamber and being in contact with said electrolyte, at least one of said electrodes being a sandwich-type structure wherein a porous conductive catalytically activating layer consisting essentially of a hydrophobic polymer and catalytic metal particles is in intimate contact at one surface with a porous hydrophobic polymer matrix and the second surface is in contact with a porous self-sustaining metal layer of uniform and controlled porosity, said porous self-sustaining metal layer facing the electrolyte chamber and said porous self-sustaining metal layer being in contact with the electrolyte of the cell.

13. The electrochemical cell of claim 12 wherein the said porous self-sustaining metal layer has a thickness of from about 5 to 20 mils and a pore size of from about 1 to 50 microns.

14. The electrochemical cell of claim 13 wherein said porous self-sustaining metal layer is nickel.

15. The electrochemical cell of claim 12 wherein the porous hydrophobic polymer matrix includes polytetrafluoroethylene.

16. The electrochemical cell of claim 15 wherein the hydrophobic polymer in the activating layer is polytetrafluoroethylene.

17. The electrochemical cell of claim 13 wherein the porous hydrophobic matrix includes polytetrafluoroethylene.

18. The electrochemical cell of claim 17 wherein the hydrophobic polymer in the activating layer is polytetrafluoroethylene.

References Cited

UNITED STATES PATENTS

| 3,097,974 | 7/1963 | McEvoy et al. | 136—120 |
| 3,113,048 | 12/1963 | Thompson | 136—121 X |
| 3,196,048 | 7/1965 | Shropshire et al. | 136—86 |
| 3,252,839 | 5/1966 | Langer et al. | 136—121 X |
| 3,282,735 | 11/1966 | Kring et al. | 136—86 |
| 3,282,738 | 11/1966 | Langer et al. | 136—120 |
| 3,305,403 | 2/1967 | Corso et al. | 136—120 |
| 3,318,730 | 5/1967 | Kreiselmaier | 117—217 |

FOREIGN PATENTS

| 953,608 | 3/1964 | Great Britain. |

WINSTON A. DOUGLAS, *Primary Examiner.*

O. F. CRUTCHFIELD, *Assistant Examiner.*

U.S. Cl. X.R.

136—120